US012092193B1

(12) United States Patent
Guo et al.

(10) Patent No.: US 12,092,193 B1
(45) Date of Patent: Sep. 17, 2024

(54) PLANETARY BEVEL GEAR AUTOMATIC LIMITED SLIP DIFFERENTIAL (71) Applicant: Hubei University of Automotive Technology, Hubei (CN)

(72) Inventors: Qinghe Guo, Hubei (CN); Yurong Chen, Hubei (CN); Wen Cheng, Hubei (CN); Renjun Liu, Hubei (CN); Shenghuai Wang, Hubei (CN); Hongxia Wang, Hubei (CN); Xiaohui Chen, Hubei (CN); Guanqin Liu, Hubei (CN); Yongping Shen, Hubei (CN); Huiyuan Li, Hubei (CN); Huihui Zhou, Hubei (CN); Mengchao Wang, Hubei (CN); Suiyu Yin, Hubei (CN); Longyong Gan, Hubei (CN)

( * ) Notice: Subject to any disclaimer, the term of this patent is extended or adjusted under 35 U.S.C. 154(b) by 0 days.

(21) Appl. No.: 18/413,782

(22) Filed: Jan. 16, 2024

(30) Foreign Application Priority Data

Apr. 16, 2023 (CN) .......................... 202310401507.7

(51) Int. Cl.
| *F16H 48/05* | (2012.01) |
| *F16H 3/66* | (2006.01) |
| *F16H 57/08* | (2006.01) |
| *F16H 48/08* | (2006.01) |
| *F16H 48/20* | (2012.01) |

(52) U.S. Cl.
CPC .............. *F16H 3/66* (2013.01); *F16H 48/05* (2013.01); *F16H 57/082* (2013.01); *F16H 2048/085* (2013.01); *F16H 2048/202* (2013.01); *F16H 2200/2007* (2013.01)

(58) Field of Classification Search
CPC .. F16H 3/66; F16H 57/082; F16H 2200/2007; F16H 2048/085; F16H 48/05; F16H 2048/202
USPC .................................................. 475/221, 231
See application file for complete search history.

(56) References Cited

U.S. PATENT DOCUMENTS

| 1,324,253 | A | * | 12/1919 | Indahl | ..................... F16H 48/08 |
| | | | | | 475/231 |
| 1,468,338 | A | * | 9/1923 | Wyman | .................. B60K 17/34 |
| | | | | | 475/221 |
| 2007/0238570 | A1 | * | 10/2007 | Engelmann | ............ B60K 17/16 |
| | | | | | 475/221 |

OTHER PUBLICATIONS

Office Action issued in Chinese Application No. 202310401507.7, dated Sep. 6, 2023.

(Continued)

*Primary Examiner* — Roger L Pang
(74) *Attorney, Agent, or Firm* — Sandy Lipkin (57) ABSTRACT A planetary bevel gear automatic limited slip differential includes five portions that are a main differential, a planetary bevel gear controller, a left drive axle shaft, a right drive axle shaft, and clutches. The planetary bevel gear controller includes an outer control unit and an inner control unit, the outer control unit includes four planetary bevel gears on an outer layer and a bevel gear fixed on a housing, and the inner control unit includes inner planetary bevel gears on an inner side and two bevel gears which have the same parameters and are meshed with the planetary bevel gears. The bevel gears are fixedly connected with outer rings of two overrunning clutches, respectively, and inner rings of the overrunning clutches and the right drive axle shaft are connected together by splines.

4 Claims, 7 Drawing Sheets (56) References Cited

OTHER PUBLICATIONS

Notification to Grant Patent issued in Chinese Application No. 202310401507.7, dated Oct. 26, 2023.

* cited by examiner

PLANETARY BEVEL GEAR AUTOMATIC LIMITED SLIP DIFFERENTIAL

CROSS-REFERENCE TO RELATED APPLICATION

This patent application claims the benefit of and priority to Chinese Patent Application No. 202310401507.7, entitled "PLANETARY BEVEL GEAR AUTOMATIC LIMITED SLIP DIFFERENTIAL" filed on Apr. 16, 2023, the disclosure of which is incorporated by reference herein in its entirety as part of the present application.

TECHNICAL FIELD

The present disclosure relates to a pure mechanical planetary bevel gear limited slip differential, which enables a vehicle to travel at a normal differential speed on the good pavement and achieve limited slip differential-speed travel in all-weather under various extreme terrain condition such as muddy, slippery and ice snow covered pavements and to have the capacities of the mechanical and automatic control of limited slip, the achievement of the maximum driving torque at full time and the normal differential-speed travel, and which is applicable to limited slip differential speed of medium and heavy commercial vehicles or off-road vehicles.

BACKGROUND

The design requirements for the differential should satisfy that the sum of the rotational speed of the left drive axle shaft and the right drive axle shaft is twice the rotational speed of the planet carrier. When vehicle is traveling straight, the left and right wheels and the planet carrier have the same rotational speed, and the driving torques on the left and right sides are equal. When the vehicle turns, the rotational speed of the inner wheel is reduced while the rotational speed of the outer wheel is increased, thus making the vehicle travel at a normal differential speed. However, when the wheels on one side of the vehicle are on slippery, muddy, ice and snow covered roads, the change of the rotational speed of the wheels on both sides exceeds the range of the normal differential speed, resulting in slipping or even complete loss of friction, which leads to the fact that the wheels on the other side do not have an enough driving force to get the vehicle out of trouble. Therefore, the general differential can only achieve normal differential speed in a good working environment.

However, the principle of the limited slip differential is that when one side of the vehicle slips, the torque of the slipping side is transmitted to the wheels on the side with adhesion through the differential speed control unit, which makes the torque of the wheels on the side with the adhesion reach the maximum to get the vehicle out of trouble. At present, the known differentials include such as a mechanical Torsen differential, an electronically controlled differential, and a differential lock differential, but the limited slip differential that can be used in medium and heavy commercial vehicles or off-road vehicles is mainly the differential lock differential, which needs manual disconnection or the connection of a differential lock, and thus is complicated and cannot achieve automatic limited slip function. Secondly, the automatic limited slip differentials for the existing passenger vehicles, whether mechanical or electronic, both employ high friction to control the limited slip torque, which have a technical bottleneck of small limited slip torque and thus cannot be applied to medium and heavy wheeled vehicles.

SUMMARY

To solve the problems in the existing differentials, the embodiments provide a planetary bevel gear automatic limited slip differential, which employs a pure mechanical structure and has the functions of automatically controlling the maximum rotational speed difference between left and right wheels at full time and preventing the wheels on one side from slipping, such that the driving torques of the left and right wheels can reach the maximum value under all-weather and all-terrain working conditions, and the function of steering at the normal differential speed can also be ensured. In a case that the vehicle travels on soft gravel roads, muddy, ice and snow covered roads, even the wheels on a single side are suspended, it can smoothly ensure that the vehicle can get out of a slipping state in time without any manual intervention.

The technical solution of the present disclosure is as follows. A planetary bevel gear automatic limited slip differential includes a housing, a main differential, a left drive axle shaft, and a right drive axle shaft. The main differential includes a left drive axle shaft gear, a right drive axle shaft gear, planetary gears, a planet carrier, and a disk gear. The disk gear is fixedly connected with the planet carrier. The planetary bevel gear automatic limited slip differential further includes a planetary bevel gear controller, which is arranged on the right drive axle shaft. The planetary bevel gear controller includes a fixed bevel gear, an inner and outer bevel gear meshing gear train, and two overrunning clutches. The inner and outer bevel gear meshing gear train is located at a middle position, and the inner and outer bevel gear meshing gear train includes an inner planetary bevel gear control unit, and an outer planetary bevel gear control unit. The inner planetary bevel gear control unit includes multiple inner planetary bevel gears, and the outer planetary bevel gear control unit includes multiple outer planetary bevel gears. The two overrunning clutches are symmetrically arranged on both sides of the inner and outer bevel gear meshing gear train. Each of the two overrunning clutches includes an outer ring, and an inner ring. The inner ring and the outer ring of the each of the two overrunning clutches are engaged with or disengaged from each other through tooth engagement. The inner ring of the each of the two overrunning clutches is fixedly connected with the right drive axle shaft. The outer ring of the each of the two overrunning clutches is fixedly connected with a corresponding one of bevel sun gears.

The multiple outer planetary bevel gears are connected to the planet carrier by pin shafts and revolve along with a rotation of the disk gear and the planet carrier. The fixed bevel gear is fixedly connected with the housing, and the multiple outer planetary bevel gears are meshed with the fixed bevel gear and rotate at a same time. The multiple inner planetary bevel gears are also connected with pin shafts and perform planetary rotation together with the multiple outer planetary bevel gears. Each of both sides of each of the multiple inner planetary bevel gears is meshed with the bevel sun gears.

The planetary bevel gear controller ensures that a maximum rotational speed of a right wheel is controlled not to exceed a theoretical maximum speed $n_{max}$ and a minimum rotational speed of the right wheel is controlled not less than a theoretical minimum speed $n_{min}$.

In a case that the rotational speed is not less than $n_{min}$ and not greater than $n_{max}$, the overrunning clutch is in an overrunning state and cannot affect the normal differential-speed travel.

In the present disclosure, the overrunning clutches A and B are both in an overrunning state in a case of normal travel. In a case of abnormal travel, i.e., the wheels on one side slip, only one overrunning clutch is in a bonding state, while the other overrunning clutch is in an overrunning state, and the two overrunning clutches do not interfere with each other. In this way, through the inner and outer planetary bevel gear control units, the rotational speeds of the left and right wheels are controlled within the limited allowable differential range of $n_{min} \sim n_{max}$, such that the differential can not only satisfy the maximum differential speed demand, but also achieve the function of automatic limited slip control in a case of vehicle slipping.

Further, each of the bevel sun gears and the outer ring of a corresponding one of the two overrunning clutches may be integrally formed to facilitate assembling and implementation and reduce a number of parts.

Further, a further clutch may be arranged outside each of the two overrunning clutches located at both sides, and when the vehicle may be in reversing, the two overrunning clutches are automatically disengaged, and the right drive axle shaft is disengaged from the planetary bevel gear controller.

The embodiments have the beneficial effects that the main differential portion is the same as an existing cone gear differential, and the key technology is that a (double-layer) planetary bevel gear differential controller structure is added, which, on the basis of ensuring normal differential-speed steering, is used to achieve the function of automatically controlling the maximum rotational speed difference at full time and all terrain, such that the driving torque of the vehicle can reach the maximum under all-terrain and all-weather working conditions. In a case that the vehicle travels on soft gravel roads, muddy, ice and snow covered roads, even the wheels on a single side are suspended, it can still automatically and smoothly ensure that the vehicle can travel normally and efficiently without slipping.

LIST OF THE REFERENCE CHARACTERS 1 driving bevel gear; 2 disk gear; 3 planetary gear; 4 left drive axle shaft gear; 5 right drive axle shaft gear; 6 fixed bevel gear; 7 planetary bevel gear; 8 inner planetary gear; 9 bevel sun gear; 10 bevel sun gear; 11 right drive axle shaft; 12 left drive axle shaft; 13 planet carrier; 14 housing; 15 cross shaft; 16 wave spring; 17 further clutch; A overrunning clutch; and B overrunning clutch.

DETAILED DESCRIPTION

The embodiments of the present disclosure are further described below with reference to the drawings.

In conjunction with FIG. 1 through FIG. 7, a planetary bevel gear automatic limited slip differential is mainly includes five portions that are a main differential, a planetary bevel gear controller: a left drive axle shaft, a right drive axle shaft, and an overrunning clutch, which is mainly applicable to automatic limited slip differentials for medium and heavy-duty vehicles with large torque.

Figure 1:
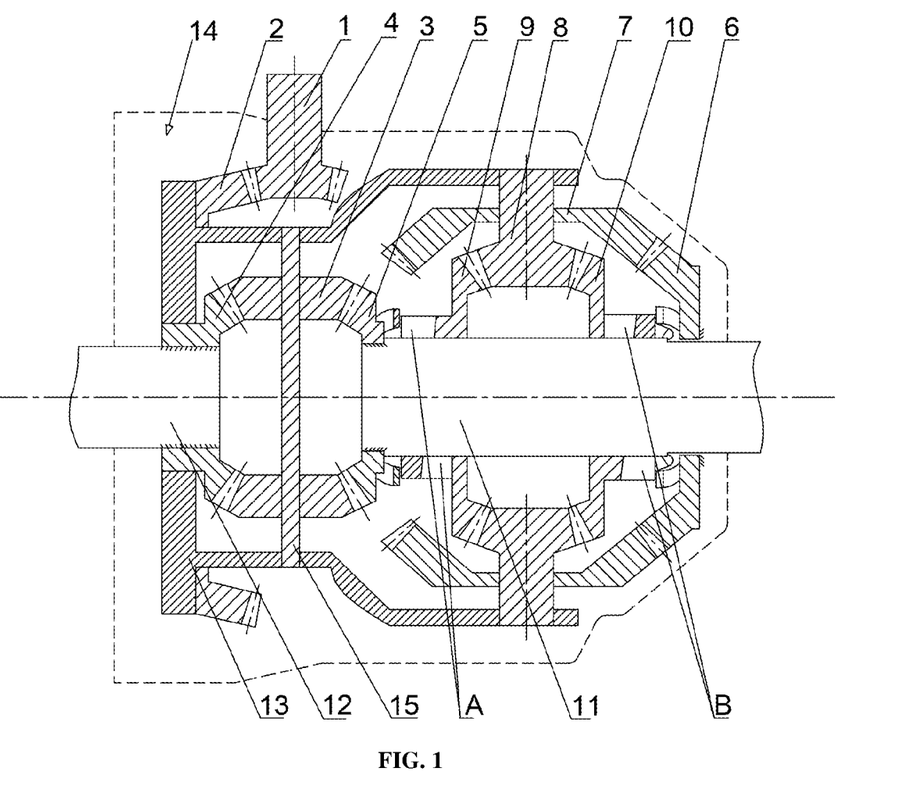
FIG. 1 is a structural schematic diagram of a planetary bevel gear automatic limited slip differential according to the present disclosure.
Figure 3:
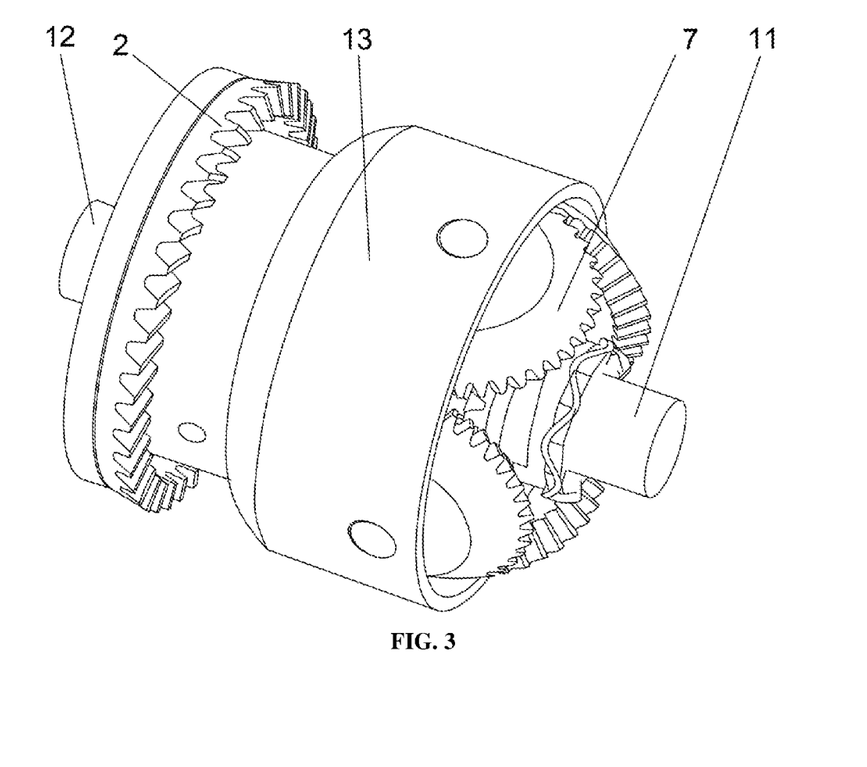
FIG. 3 is a schematic diagram of a three-dimensional structure of the planetary bevel gear automatic limited slip differential according to the present disclosure (a housing and a fixed bevel gear are removed in the figure)
Figure 4:
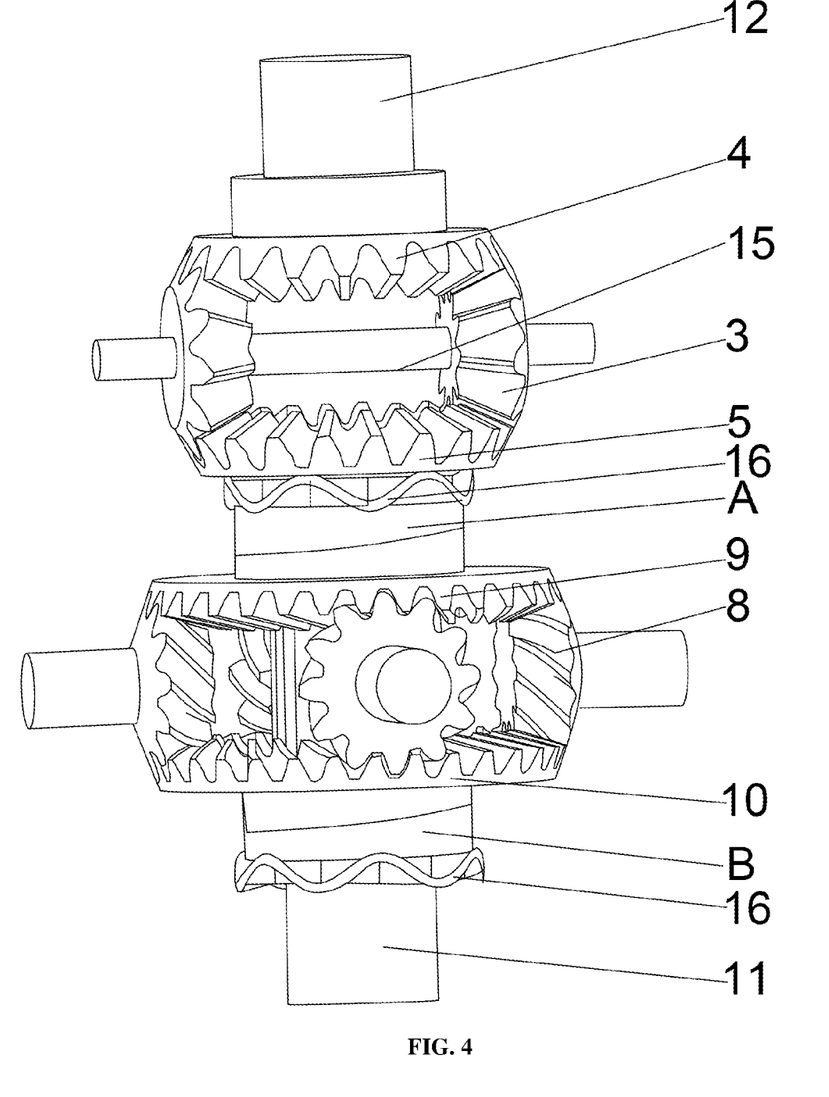
FIG. 4 is a schematic diagram of three-dimensional structures of a main differential, an overrunning clutch and an inner planetary bevel gear control unit according to the present disclosure.
Figure 5:
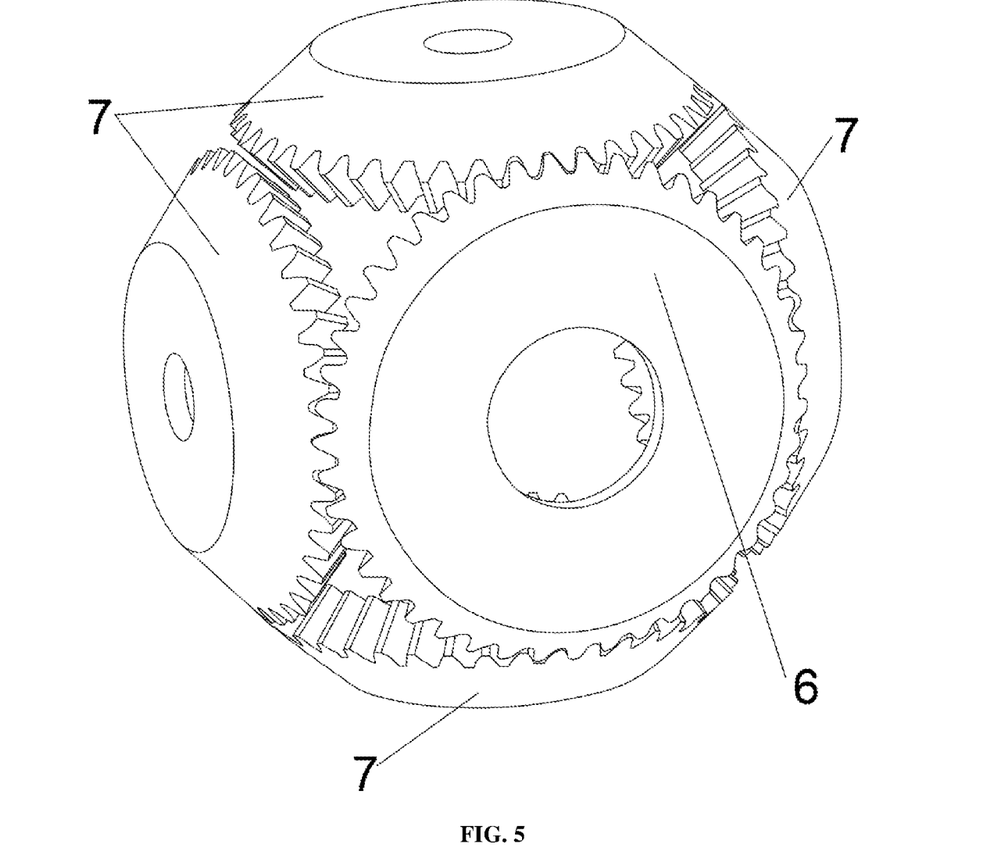
FIG. 5 is a schematic diagram of a three-dimensional structure of the inner planetary bevel gear control unit according to the present disclosure.

The principle of the main differential portion above-mentioned is not different from that of the existing cone gear differential, but the structure of the main differential portion is slightly different (as shown in FIG. 1, FIG. 3 and FIG. 4) from the structure of the existing cone gear differential. The main differential portion is mainly configured to achieve a differential-speed steering function of the vehicle under normal travel conditions, and includes a disk gear 2 fixedly connected with a planetary carrier, a cross shaft 15, a planetary gear 3, a left drive axle shaft gear 4, a right drive axle shaft gear 5, and a planetary carrier 13, so as to achieve the differential-speed steering function of the vehicle under normal travel conditions. The planet carrier 13 and the cross shaft 15 are connected together, and the planetary gear 3 is installed on the cross shaft 15. The planetary gear 3 is symmetrically and constantly meshed with the left drive axle shaft gear 4 and the right drive axle shaft gear 5, and inner holes of the left drive axle shaft gear 4 and the right drive axle shaft gear 5 are provided with internal splines, which are respectively connected to external splines of a left drive axle shaft 12 and a right drive axle shaft 11.

To describe clearly, overrunning clutches are defined as an overrunning clutch A and an overrunning clutch B.

In this embodiment, the planetary bevel gear controller is arranged on the right drive axle shaft of the main differential, and includes a fixed bevel gear 6, an inner and outer bevel gear meshing train, and two overrunning clutches (the overrunning clutch A and the overrunning clutch B). The inner and outer bevel gear meshing train includes an inner control unit and an outer control unit, which are defined as an inner planetary bevel gear control unit and an outer planetary bevel gear control unit. The outer control unit includes four planetary bevel gears 7 at an included angle of 90° with each other, the fixed bevel gear 6 is fixedly connected with a housing 14 (the dashed outline in FIG. 1 represents the housing), and the outer layer planetary bevel gears 7 are meshed with the fixed bevel gear 6 and rotate at the same time. The inner planetary gear control unit includes four inner planetary gears 8 connected with the outer planetary gears by pin shafts, and both sides of each inner planetary bevel gear 8 are respectively meshed with bevel sun gears 9 and 10.

The inner planetary bevel gear control unit includes four planetary bevel gears 8 with the same specification parameters, and the planetary bevel gears 8 are arranged at an included angle of 90° with each another. The two bevel sun gears 9 and 10 have the same parameters, an outer ring of the overrunning clutch A and the bevel sun gear 9 are coupled into a whole, and an outer ring of the overrunning clutch B and the bevel sun gear 10 are coupled into a whole. An inner ring of the overrunning clutch B is splined to the right drive axle shaft 11 to control the minimum rotational speed of the right drive axle shaft to not less than a theoretical minimum speed $n_{min}$, and an inner ring of the overrunning clutch A is splined to the right drive axle shaft 111 to control the maximum rotational speed of the right drive axle shaft not to exceed a theoretical maximum speed $n_{max}$.

Figure 6:
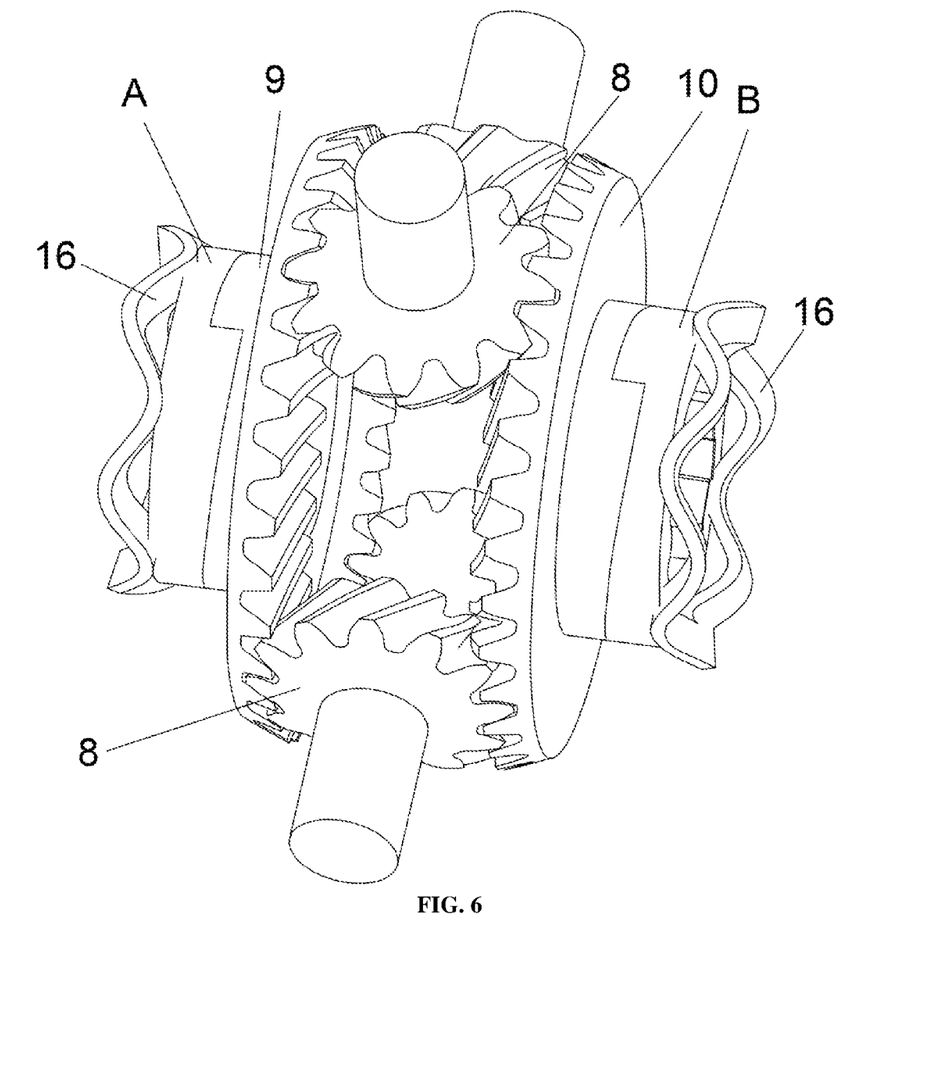
FIG. 6 is a schematic diagram of three-dimensional structures of the overrunning clutch and the inner planetary bevel gear control unit according to the present disclosure.

In a further description, as shown in FIG. 4 and FIG. 6, each of the inner ring of the overrunning clutch A and the inner ring of the overrunning clutch B is provided with a wave spring 16 for resetting. Such a resetting arrangement is conventional technical means and thus will not be described in detail.

Figure 7:
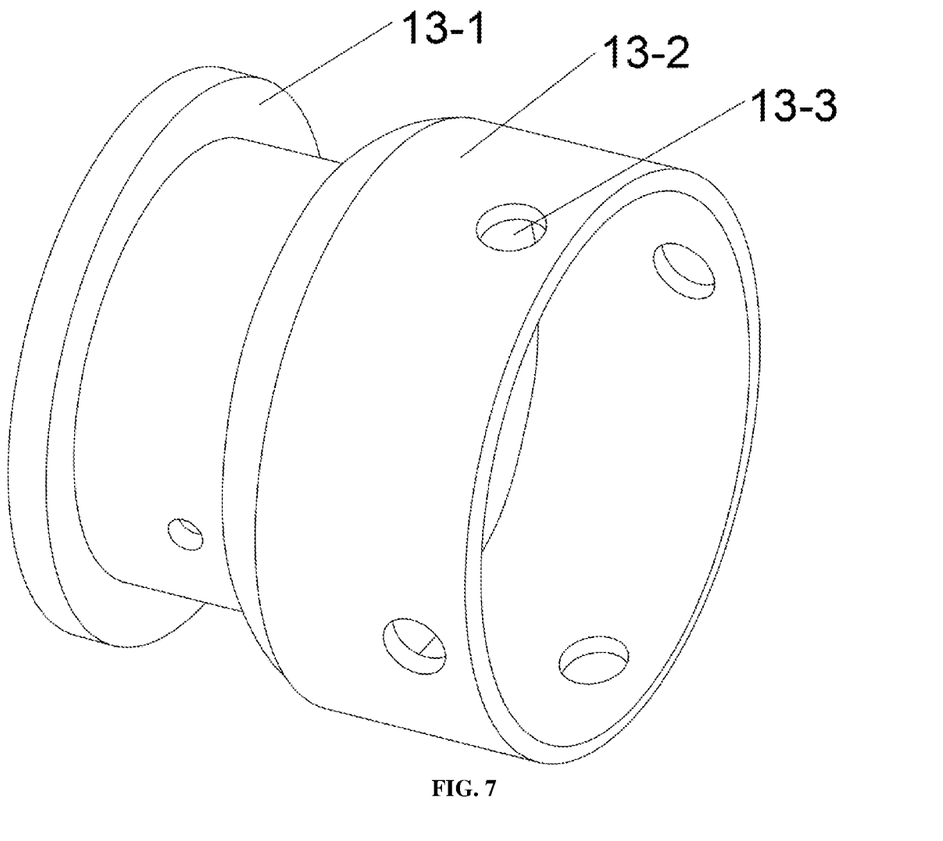
FIG. 7 is a structural schematic diagram of a planet carrier (housing) according to the present disclosure.

In a further description, as shown in FIG. 7, the planet carrier is integrally formed by a connecting flange 13-1 and an extension connecting sleeve 13-2, four pin shaft holes 13-3 are uniformly distributed along a circumference of the extension connecting sleeve 13-2, and the planetary bevel gears 8 are installed on the planet carrier by pin shafts.

Under normal travel conditions, the power of an engine is input to the (driven) disk gear 2 through a driving bevel gear 1, so as to drive the planet carrier 13 to rotate. At this time, the planet carrier of the main differential portion and the planetary pin shafts on the planetary bevel gear controller rotate together, thus driving the left drive axle shaft and the right drive axle shaft to rotate and the inner planetary bevel gear and the outer planetary bevel gear to revolve around the sun gear. In this case, the planetary bevel gear controller does not play a role, and the main differential portion is mainly configured for steering travel at a normal differential speed. When a right wheel slips, the adhesion of the right wheel is almost zero, at the moment, the rotational speed of the right wheel increases to drive the rotational speed of the inner ring of the overrunning clutch A splined to the right drive axle shaft to approach the rotational speed of the outer ring of the overrunning clutch A, and thus the overrunning clutch A is in a bonding state to prevent the rotational speed of the inner ring from increasing further. In this case, the rotational speed of the outer ring of the overrunning clutch A begins to limit the rotational speed of the right wheel from exceeding the theoretical maximum rotational speed $n_{max}$, and the power of the engine is automatically transmitted to a left wheel with adhesion to make the vehicle get out of trouble. When the left wheel slips, the adhesion is almost zero, which leads to the decrease of the rotational speed of the right wheel. The rotational speeds of the right drive axle shaft and the inner ring of the overrunning clutch B approach the rotational speed of the outer ring of the overrunning clutch B, the overrunning clutch B begins to be in a bonding state to prevent the rotational speed of the right drive axle shaft from continuing to decrease, thus making the rotational speed of the right drive axle shaft not less than the theoretical minimum speed $n_{min}$. At the moment, the power of the engine is automatically transmitted to the right wheel with adhesion to make the vehicle get out of trouble.

Through the inner and outer planetary bevel gear control units, the rotational speed of the right wheel is controlled within the theoretically allowable rotational speed range of $n_{min}$–$n_{max}$, thus achieving the purpose of limited slip.

In the present disclosure, when the rotational speed of the outer ring (fixedly connected to the sun gear 9) of the overrunning clutch A is greater than that of the inner ring (splined to the right drive axle shaft 11) of the overrunning clutch A, the clutch is in an overrunning state. When the rotational speed of the outer ring (fixedly connected to the sun gear 9) of the overrunning clutch A is less than that of the inner ring (splined to the right drive axle shaft 11) of the overrunning clutch A, the clutch is in a bonding state. When the rotational speed of the outer ring (coupled to the sun gear 10) of the overrunning clutch B is less than that of the inner ring (splined to the right drive axle shaft 11) of the overrunning clutch B, the clutch is in an overrunning state, and when the rotational speed of the outer ring (coupled to the sun gear 10) of the overrunning clutch B is greater than that of the inner ring (splined to the right drive axle shaft 11) of the overrunning clutch B, the clutch is in a bonding state. The purpose of controlling the rotational speed range of the right drive axle shaft is achieved through the bonding states or the overrunning states of the overrunning clutch A and the overrunning clutch B.

The working principle of the present disclosure is described as follows.

Figure 2:
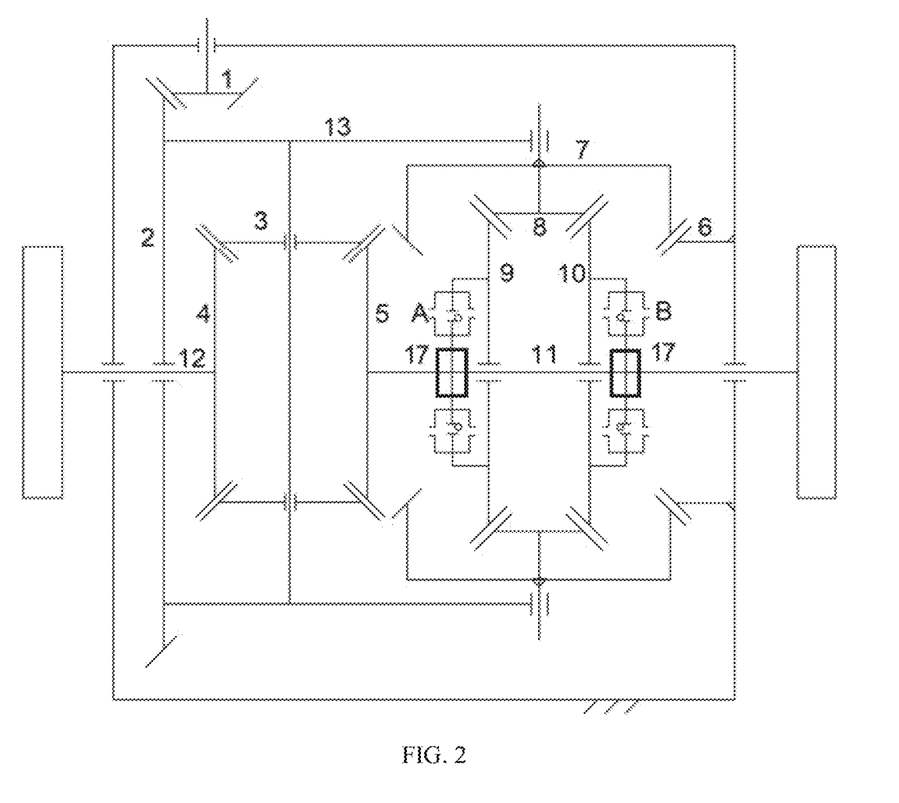
FIG. 2 is a working schematic diagram of the planetary bevel gear automatic limited slip differential according to the present disclosure.

The working principle of the planetary gear bevel limited slip differential is as shown in FIG. 2. The working principle of the main differential 1 in the present disclosure is the same as that of a conventional differential. The power of the engine is transmitted to the disk gear 2 at the main differential portion through a gearbox, and the power of the main differential is divided into two paths for transmitting, one path of the power is distributed to the left drive axle shaft and the right drive axle shaft through a planetary gear train, while the other path of the power is distributed to the planetary bevel gear controller through the planet carrier 13 of the differential. Under a normal travel working condition, the planetary bevel gear controller spins without consuming the power, and only in the case that the wheel on one side of the vehicle slips and the rotational speed exceeds the normal range, the planetary bevel gear controller may make a difference.

The working principle of the planetary gear bevel limited slip differential is described as follows in conjunction with FIG. 2 and FIG. 3:

A minimum turning radius $r_{min}$ and a wheel distance 2 L of any vehicle are unchanged, when the vehicle turns, the left wheel and the right wheel have the maximum rotational speed difference, and a limit rotational speed is:

$$n_{min} = \left(1 - \frac{L}{r_{min}}\right) \cdot n_0 \quad (1)$$

$$n_{max} = \left(1 + \frac{L}{r_{min}}\right) \cdot n_0 \quad (2)$$

$$\frac{L}{r_{min}}$$

ranges from 0.1 to 0.25 in general.

Assuming that the number of teeth of each gear of the planetary bevel gear controller satisfies the following:

$$k = \frac{z_6 z_8}{z_7 z_9} = \frac{z_6 z_8}{z_7 z_{10}},$$

the rotational speeds of the gears $n_9$ and $n_{10}$ may be obtained according to the transmission principle of the planetary gear train:

$$n_9=(1+k)\cdot n_0 \quad (3)$$

$$n_{10}=(1-k)\cdot n_0 \quad (4)$$

The appropriate number of teeth of the gear is selected, making $$k = \frac{L}{r_{min}},$$

such that $$n_{min}=n_{10}=(1-k)\cdot n_0 \quad (5)$$

$$n_{max}=n_9=(1+k)\cdot n_0 \quad (6)$$

As the outer rings of the overrunning clutch A and the overrunning clutch B are fixedly connected to the gears 9 and 10, respectively, the inner rings of the overrunning clutch A and the overrunning clutch B are fixedly connected to the right drive axle shaft, and thus the rotational speed $n_2$ of the right drive axle shaft is always limited between the limit rotational speed $n_{min}$ and $n_{max}$, that is:

$$n_{min}=(1-k)\cdot n_0 \leq n_2 \leq n_{max}=(1+k)\cdot n_0 \quad (7)$$

$n_2=2n_0-n_1$ is substituted into an inequality (7) to obtain $$n_{min}=(1-k)\cdot n_0 \leq n_1 \leq n_{max}=(1+k)\cdot n_0 \quad (8)$$

The inequalities (7) and (8) show that under any working condition, the wheels on both sides satisfy steering requirements with the minimum turning radius, and the rotational speeds of the wheels are constantly controlled between $n_{min}$–$n_{max}$. If any wheel slips, the power torque of the engine may be automatically transmitted to the non-slip wheel, thus achieving the purpose of automatic limited slip.

When the vehicle is at the minimum turning radius, the left and right drive axle shafts have the maximum rotational speed difference. Assuming that a differential speed ratio k of a certain vehicle is equal to 25%, $n_{10}=n_{min}=0.75n_0$, $n_9=n_{max}=1.25n_0$.

When the vehicle goes straight, $n_1=n_2=n_0$, $n_{10}=0.75n_0$, and $n_9=1.25n_0$.

As the outer ring of the overrunning clutch A is fixedly connected with the gear 9, and the inner ring of the overrunning clutch A is splined to the right drive axle shaft, the rotational speed $n_2=n_0$ of the inner ring of the overrunning clutch A is less than the rotational speed $n_9=1.25n_0$ of the outer ring of the overrunning clutch A, and the overrunning clutch A is in an overrunning state at the moment. As the outer ring of the overrunning clutch B is fixedly connected with the gear 10, and the inner ring of the overrunning clutch B is splined to the right drive axle shaft, the rotational speed $n_2=n_0$ of the inner ring of the overrunning clutch B is greater than the rotational speed $n_{10}=0.75n_0$ of the outer ring of the overrunning clutch B, and the overrunning clutch B is also in an overrunning state.

When the vehicle turns left, $n_1 \geq 0.75n_0$, $n_2 \leq 1.25n_0$, the rotational speed $n_2$ of the inner ring of the overrunning clutch A splined to the right drive axle shaft is less than the rotational speed $n_9=1.25n_0$ of the outer ring of the overrunning clutch A coupled with the gear 9, and the overrunning clutch A is in an overrunning state at the moment. The rotational speed $n_2$ of the inner ring of the overrunning clutch B splined to the right drive axle shaft is greater than or equal to the rotational speed $n_{10}=0.75n_0$ of the outer ring of the overrunning clutch B coupled with the gear 10, and the overrunning clutch B is also in an overrunning state, the rotational speed $n_2$ of the right drive axle shaft cannot be affected, and the vehicle can turn at a normal differential speed.

When the vehicle turns right, $n_1 \leq 1.25n_0$, $n_2 \geq 0.75n_0$, the rotational speed $n_2$ of the inner ring of the overrunning clutch A splined to the right drive axle shaft is less than the rotational speed $n_9=1.25n_0$ of the outer ring of the overrunning clutch A coupled with the gear 9, and the overrunning clutch A is in an overrunning state at the moment. The rotational speed $n_2$ of the inner ring of the overrunning clutch B splined to the right drive axle shaft is greater than the rotational speed $n_{10}=0.75n_0$ of the outer ring of the overrunning clutch B coupled with the gear 10, the overrunning clutch B is also in an overrunning state, and at the moment, the rotational speed $n_2$ of the right drive axle shaft cannot be affected, and the vehicle can turn and travel at a normal differential speed.

When the right wheel slips suddenly during the travel of the vehicle, the rotational speed $n_2$ of the right drive axle shaft is about to exceed the normal rotational speed range and approach the rotational speed $n_9=1.25n_0$ of the outer ring of the overrunning clutch A fixedly connected with the gear 9, the overrunning clutch A is in a bonding state, that is, the rotational speed $n_2$ of the right drive axle shaft is consistent with the rotational speed ng of the gear 9, thus limiting the rotational speed $n_2$ of the right drive axle shaft from continuing to increase. The rotational speed $n_2$ of the inner ring of the overrunning clutch B is greater than the rotational speed $n_{10}$ of the outer ring of the overrunning clutch B, and the overrunning clutch B is in an overrunning state. Through the above process, the rotational speed of the right wheel does not continue to increase, and the process of limiting slip continues to occur, thus ensuring the normal travel of the vehicle.

When the left wheel slips suddenly during the travel of the vehicle, $n_1 > 1.25n_0$, the main differential satisfies $n_1+n_2=2n_0$, there must be a situation of $n_2 < 0.75n_0$, the rotational speed $n_2$ of the inner ring of the overrunning clutch A splined to the right drive axle shaft is less than the rotational speed $n_9$ of the outer ring of the overrunning clutch A, such that the overrunning clutch A is in an overrunning state and does not affect the rotational speed of the right drive axle shaft. The rotational speed $n_2$ of the inner ring of the overrunning clutch B approaches or is less than the rotational speed $n_{10}$ of the outer ring of the overrunning clutch B, the overrunning clutch B is in a bonding state to prevent the rotational speed of the right drive axle shaft from continuing to decrease, thus limiting the process of slipping and ensuring the normal travel of the vehicle.

In conclusion, whether the vehicle travels in a straight line, travels with left and right differential steering, or in the case that any wheel on the left and right slips, the automatic limited slip function can be achieved to ensure the normal travel and passing of the vehicle. The rotational speed of the right wheel is controlled within the range of $(1-k)\cdot n_0$–$(1+k)\cdot n_0$, thus achieving the normal differential-speed steering of the vehicle at the maximum or minimum turning radius and automatically achieving the limited slip function.

What is claimed is:

1. A planetary bevel gear automatic limited slip differential, comprising a housing, a main differential, a left drive axle shaft, and a right drive axle shaft, wherein the main differential comprises a left drive axle shaft gear, a right drive axle shaft gear, planetary gears, a planet carrier, and a disk gear, wherein the disk gear is fixedly connected with the planet carrier:

the planetary bevel gear automatic limited slip differential further comprises a planetary bevel gear controller, which is arranged on the right drive axle shaft: the planetary bevel gear controller comprises a fixed bevel gear, an inner and outer bevel gear meshing gear train, and two overrunning clutches, the inner and outer bevel gear meshing gear train is located at a middle position, and the inner and outer bevel gear meshing gear train comprises an inner planetary bevel gear control unit, and an outer planetary bevel gear control unit: the inner planetary bevel gear control unit comprises a plurality of inner planetary bevel gears, the outer planetary bevel gear control unit comprises a plurality of outer planetary bevel gears, and the two overrunning clutches are symmetrically arranged on both sides of the inner and outer bevel gear meshing gear train: each of the two overrunning clutches comprises an outer ring, and an inner ring, the inner ring and the outer ring of the each of the two overrunning clutches are engaged with or disengaged from each other through tooth engagement: the inner ring of the each of the two overrunning clutches is fixedly connected with the right drive axle shaft, and the outer ring of the each of the two overrunning clutches is fixedly connected with a corresponding one of bevel sun gears;

the plurality of outer planetary bevel gears are connected to the planet carrier by pin shafts and revolve along with a rotation of the disk gear and the planet carrier:

the fixed bevel gear is fixedly connected with the housing, and the plurality of outer planetary bevel gears are meshed with the fixed bevel gear and rotate at a same time: the plurality of inner planetary bevel gears are also connected with pin shafts and perform planetary rotation together with the plurality of outer planetary bevel gears, and the plurality of inner planetary bevel gears rotate at a same time; and each of both sides of each of the plurality of inner planetary bevel gears is meshed with a corresponding one of the bevel sun gears;

the planetary bevel gear controller ensures that a maximum rotational speed of a right wheel is controlled not to exceed a theoretical maximum speed $n_{max}$ and a minimum rotational speed of the right wheel is controlled not less than a theoretical minimum speed $n_{min}$.

2. The planetary bevel gear automatic limited slip differential according to claim 1, wherein each of the bevel sun gears and the outer ring of a corresponding one of the two overrunning clutches are integrally formed to achieve a fixed connection.

3. The planetary bevel gear automatic limited slip differential according to claim 1, wherein a further clutch is arranged outside each of the two overrunning clutches located at both sides, and when a vehicle is in reversing, the two overrunning clutches are automatically disengaged, and the right drive axle shaft is disengaged from the planetary bevel gear controller.

4. The planetary bevel gear automatic limited slip differential according to claim 2, wherein a further clutch is arranged outside each of the two overrunning clutches located at both sides, and when a vehicle is in reversing, the two overrunning clutches are automatically disengaged, and the right drive axle shaft is disengaged from the planetary bevel gear controller.

* * * * *